United States Patent [19]
Needham

[11] Patent Number: 4,518,844
[45] Date of Patent: May 21, 1985

[54] SHORT-CIRCUIT MIG WELDING

[75] Inventor: James C. Needham, Saffron Walden, England

[73] Assignee: The Welding Institute, Cambridge, England

[21] Appl. No.: 587,310

[22] Filed: Mar. 7, 1984

[30] Foreign Application Priority Data

Mar. 10, 1983 [GB] United Kingdom ................ 8306578

[51] Int. Cl.³ .............................................. B23K 9/10
[52] U.S. Cl. ........................ 219/137 PS; 219/130.01; 219/130.21; 219/130.51
[58] Field of Search ...................... 219/130.01, 130.21, 219/130.33, 130.5, 130.51, 137 PS

[56] References Cited

U.S. PATENT DOCUMENTS

| 3,673,377 | 6/1972 | Erdmann-Jesnitzer et al. ... 219/137 PS |
| 4,000,374 | 12/1976 | De Keyser ..................... 219/130.33 |
| 4,020,320 | 4/1977 | Pijls et al. ..................... 219/130.21 |
| 4,300,035 | 11/1981 | Johansson ..................... 219/130.21 |
| 4,300,036 | 11/1981 | Johansson ..................... 219/130.33 |

Primary Examiner—Clifford C. Shaw
Attorney, Agent, or Firm—Martin Novack

[57] ABSTRACT

A method and apparatus for short-circuit MIG welding is described. The apparatus comprises a power supply electrically connected with electrode wire and a workpiece in use; and electrode wire feed means. Monitoring means is provided for monitoring the ratio (M) of one of the mean and successive integral of the arc duration to the corresponding one of the mean and the successive integral of the short-circuit duration. The welding process can be monitored by monitoring the ratio (M).

22 Claims, 21 Drawing Figures

SHORT-CIRCUIT MIG WELDING

This invention relates to short-circuit MIG welding in which a wire electrode, which is normally solid but which may also be flux-cored, is fed at a nominally constant average speed through a welding gun wherein it forms one pole of an arc which is struck between the wire electrode and the work to be welded, and wherein the operating conditions are so chosen that the majority of the material transfer is accompanied by short-circuiting.

In typical short-circuit welding systems, a power source supplies an e.m.f. (voltage) to the wire electrode, the average current in which is determined by the wire feed speed so that the burn off rate is substantially the same as the feed rate. The operating conditions of this system are further modified both by the short-circuiting itself and by the introduction of series inductance to control the so-called dynamic characteristics, that is the rise and fall of the instantaneous current caused by short-circuit make and break. In practice, the overall interaction between power source output voltage, wire feed speed, and inductance requires skill and experience on the part of the operator to obtain the preferred optimum combination for a given welding application.

Attempts have been made in the past to monitor short-circuit MIG welding, particularly in order to enable some form of automatic control to be achieved although it is desirable in any case for the operator to be able to monitor the welding process. It is already well established that the average frequency of shorting in the MIG process varies with the supply voltage at a given wire feed speed and wire diameter such that with increasing voltage the frequency rises and passes through a peak before falling virtually to zero as the free flight or open arc condition is approached. This feature has not turned out to be satisfactory in practice for monitoring or control since the short-circuiting is not stable in detail and often is subject to short term variation over at least a 2:1 range so that only a long-term average can be utilised. Moreover, the variation of average frequency of shorting with supply voltage exhibits a broad, indefinite peak, with two voltage values corresponding to any frequency less than the nominal maximum.

Other parameters have been considered such as the degree of variance in the short-circuit current peaks. This also changes with the supply voltage, the wire feed speed and wire diameter and so forth. Likewise the degree of variance passes through a minimum at a voltage which approximately corresponds to the peak short-circuit frequency. However such parameters are subject to the same limitations of lack of precision, double value of voltage and the requirement for long-term averages.

In accordance with one aspect of the present invention, a method of short-circuit MIG welding includes the step of monitoring the ratio of one of the mean and the successive integral of the arc duration to the corresponding one of the mean and successive integral of the short-circuit duration.

Successive integral here means the sum of the respective arc and short-circuit durations over a succession of shorting events. In other words, to obtain the mean duration over a succession of shorting events, the successive integral is divided by the number of shorting events.

We have discovered that this simple ratio (referred to as M) is sensitive to change in the supply voltage and continuously changes with that voltage (i.e. does not exhibit a peak or dual value condition). Moreover, this ratio is in principle substantially independent of the shorting frequency or the amount of inductance with typical power supplies of nominally flat characteristic output. The sensitivity of M is indicated by that fact that for only a one volt change in the power supply, that is of the order of 4 percent, its value for a nominally constant potential arc changes by some 30 percent. The value of M ranges from near unity for conditions of hard stubbing or severe short-circuiting to virtually infinity as the free arc condition is approached. In practice, the value of M lies in the range from 2 to 10 and for typical short-circuit MIG welding, as practised, the value preferably lies in the range of from 3 to 5.

This method provides a relatively simple way to monitor the short-circuit behaviour in the MIG process. The ratio M is reasonably consistent over relatively short periods of time such as 0.1 seconds and is preferably determined over between four and twelve, most preferably 10 successive short-circuit cycles. This consistency is maintained even if the cycle time or frequency of short-circuiting is varying under otherwise constant circuit and arc parameters.

Preferably, one or more of the open circuit voltage, the effective resistance of the welding circuit, and the average wire feed speed is adjusted to maintain the monitored ratio substantially constant. This may be achieved by feeding back the monitored value of M to control means operating on the power supply, the welding circuit, or wire feed means to maintain the value of M at a desired average level. It is particularly convenient to adjust the effective resistance of the welding circuit or the open circuit voltage and in the latter case this is achieved by altering the effective e.m.f. of the power supply. Changing the average wire feed speed is useful when a power supply is used that is relatively resistive or has a significantly falling output characteristic.

It has already been explained above that M is not significantly sensitive to short-circuit frequency. However, in addition to maintaining a substantially constant value of M it is often desirable to control the short-circuit frequency. Attempts have been made in the past to effect such control for example by controlling the average supply voltage. However, the degree of control is limited as the short-circuiting frequency is not an absolute function of the voltage, being influenced also by the weld pool and welding conditions generally and, except at the peak value, there are at least two voltages corresponding to a given frequency (as mentioned above). Thus it is preferred to influence frequency (at a given M value) by adjustment of the inductance and where applicable the current level at which it saturates significantly. Furthermore, modification of the short-circuit frequency may be necessary since at a preferred value of the ratio M, the average frequency may be too low, corresponding to relatively coarse metal transfer.

Thus preferably one or both of the effective circuit voltage and the wire feed speed are additionally oscillated about their mean value to control the short-circuit frequency.

In one particularly advantageous method, the ratio M is fed back to adjust the average voltage of the power supply while the power supply is modulated in detail and this is particularly useful with the fast acting transistor type power supplies. Alternatively, the ratio M may be fed back to adjust the average wire feed speed while the wire feed speed is additionally modulated in detail.

In another arrangement, the power supply or the wire feed speed or both can be modulated so as to influence both the ratio of the arc to short-circuit duration and the cyclic frequency. This arrangement can be operated on an open loop basis or made dependent on the short-circuiting behaviour itself. For example the modulation of the power supply or the wire feed speed or both at the desired frequency can be carried out to obtain a preselected mark space ratio corresponding to the desired M ratio. For example, the power source output may be held low for a period of 2 ms and conversely the power supply held high for 8 ms so as to encourage short-circuiting at 100 Hz with a value of 4 for the arc to short-circuit duration ratio. Preferably, a closed loop control of the power source voltage based on the ratio M is combined with the open loop system, such that the average ratio of arc duration to short-circuit duration is also at a similar value, viz 4.

To aid better synchronisation between the modulation and the short-circuit behaviour it is advantageous to synchronise the modulation with a particular part of the short-circuit cycle. For example with respect to open circuit voltage alone, the voltage can be increased immediately on the onset of the short-circuit or after an initial delay of say 1 ms and likewise during the arcing period the voltage can be reduced, particularly after a finite period measured from the start of the short-circuit cycle or alternatively from the start of arcing such that fall in voltage occurs towards the end of the expected cycle period. In the case of modulating wire feed speed, the wire feed speed can be reduced immediately on the onset of the short-circuit or after a delay period and likewise during the arcing period the feed speed can be increased. If the feed speed is controlled with a stepping motor in a stop/start mode, the feed speed can be arrested during the short-circuit period or after a finite interval after the start of the short-circuit and likewise the feed speed doubled during the latter part of the arcing period by the inhibit facility and the half-step/full-step facility in the stepping motor drive system. In a more extreme arrangement the feed may even be reversed during the short-circuit period after a preferred interval with the normal forward motion restored immediately after arcing commences following the break of the short-circuit using the forward-reverse facility in the stepping motor drive.

In accordance with a second aspect of the present invention, short-circuit MIG welding apparatus comprises a power supply electrically connected with electrode wire and a workpiece in use; and electrode wire feed means, wherein the apparatus further includes means for monitoring the ratio of one of the mean and the successive integral of the arc duration to the corresponding one of the mean and the successive integral of the short-circuit duration.

Although relative movement between the electrode wire and the workpiece could be achieved manually, preferably the apparatus includes means (such as a robot arm) to achieve this.

In one construction, the monitoring means includes a capacitor which is charged as a function of the mean short-circuit time; and indicating means for providing an indication of the stored charge. This construction relies on the fact that when a short-circuit is not taking place then an open arc condition is in effect. Thus, the charge stored on the capacitor can be directly related to the ratio M and the indicating means may comprise a non-linear dial.

In an alternative arrangement, the monitoring means includes means for determining one of the mean and the successive integral of the arc duration and the corresponding one of the mean and the successive integral of the short-circuit duration and means for determining the ratio therebetween, and means for providing an indication of the determined ratio.

This arrangement may be constructed as an analogue system or a digital system. One example of such an analogue system comprises two capacitors, one of which is charged as a function of the mean arc-on time and the other of which is charged as a function of mean short-circuit time, the monitoring means comprising analogue dividing means for dividing the charges stored on the capacitors to derive a signal representing M. It is convenient to choose the charge-discharge conditions or time constants for the arc and short-circuit periods so that similar charges are obtained for comparison or for obtaining approximately unity as the quotient.

The monitoring means may alternatively be constructed at least partially so as to calculate digitally the value of M and to this end may include a micro-processor.

Conveniently, the apparatus further comprises control means for adjusting one or more of the effective e.m.f. of the power supply, the effective resistance of the welding circuit, and the average wire feed speed in accordance with a signal supplied by the monitoring means representative of the determined ratio. The advantages of feeding back the value of M in this way have been previously discussed.

Additionally, it is preferable if the apparatus further comprises a switched impedance in the welding circuit to modulate the effective e.m.f. of the power supply. For example, some degree of modulation can be obtained with conventional transformer-rectifier type power supplies or other constant potential sources, by inserting a switched impedance in the output circuit. The impedance may comprise a simple resistor but preferably comprises a set of diodes in series so that the voltage drop is consistent over a range of operating currents. This impedance is bypassed by a transistor or thyristor semi-conductor device. The thyristor has the advantage of low voltage drop and high current capability but requires suitable control circuitry to switch it off whereas the transistor although more limited in current handling capability and hence requiring a number of transistors operated in parallel, can be readily turned on and off. As the total voltage drop is limited by the diodes to some four or five volts, high current switching transistors can be used for the bypass to give the required modulation in effective power supply.

The use of a switched impedance can be used to obtain a preselected mark space ratio. For example, the power source output may be held low (diode train inserted) for a specific period and then held high (with the diode train shorted out) for a second period.

Alternatively, the wire feed speed may be modulated about a mean value. Since the short-circuit frequency is of the order of 100 Hz, if it is desired to modulate the wire feed speed this must be done over short time periods of a few milliseconds.

In principle mechanical means such as elliptical gearing between the motor drive and the feed rolls could be used to provide a fixed degree of modulation. However, it is preferred to use electrical means such as a low inertia drive or digital drive such as is provided by a stepping motor operated virtually in its stop/start mode. With a stepping motor it is feasible to change speed or stop or reverse the direction of drive in a time period corresponding to one step only. Stepping motors of adequate torque and response are available such as the so-called 5 φ unit which operates with 500 steps per revolution (or 1,000 half steps). Such a stepping motor can readily provide wire feed speeds of the order of 5 or even 10 m/min but, if necessary, the drive can be supplemented by a continuous or analogue motor which is used to pull the wire from its supply reel at the desired average rate while providing a lost loop between it and the stepping motor drive so that the latter can respond rapidly without experiencing the inertia of the wire reel itself. This latter arrangement is described in our pending British Patent Application No. 2 120 692 A. One method of improving the regularity of short-circuiting is therefore to change the wire feed speed cyclically at the desired frequency. For example using the full and half step facility in the drive circuits to the stepping motor, its speed can be instantaneously halved at a constant pulse train frequency. Thus for a given average wire feed speed the pulse train may be chosen to be 33 percent higher and during operation the motor is alternately switched from full step to half step cylclically at the desired short-circuit frequency such as 100 Hz. The stepping motor then runs for 5 ms at half speed and equally for 5 ms at full speed so that the average speed is three quarters of the maximum. Alternatively different pulse train frequencies can be used for the slower and faster speeds respectively.

Some examples of methods and apparatus for short-circuit MIG welding will now be described with reference to the accompanying drawings, in which.

Figure 1:
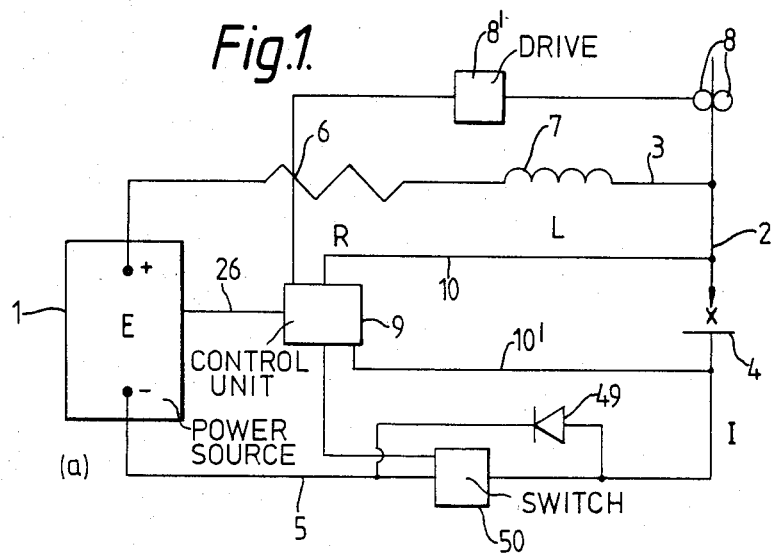
FIG. 1 is a schematic block circuit diagram of the apparatus.

FIG. 1 illustrates a short-circuit MIG welding circuit having a power source 1 with the positive terminal of the power source 1 connected to an electrode wire 2 via a connecting lead 3 and the negative terminal of the power supply 1 being connected to a work piece 4 via a connecting lead 5. For clarity, the total impedance in the welding circuit is represented by a series resistance 6 and inductance 7. Electrode wire is fed in a conventional way from a store (not shown) through the nip between a pair of feed rollers 8 actuated by drive means 8' towards the work piece 4.

In use, the welding circuit develops an average current I which is necessary to consume the electrode wire 2 on average as fast as it is fed towards the work piece by the feed rollers 8, in order to maintain equilibrium. For the purposes of this description, it is assumed that the welding arc has two independent states; first a fixed voltage $V_A$, where the arc alone is present, and second zero voltage during the short-circuit (since any resistive elements are included in the overall circuit resistance 6). The short-circuit/arc conditions can thus be treated simply as being equivalent to a switch. The average load voltage $V_w$ represented by the welding arc is given by $$\frac{(M)}{(M+1)} V_A$$

where M is the ratio of average arc duration to average short-circuit duration.

Figure 2A:
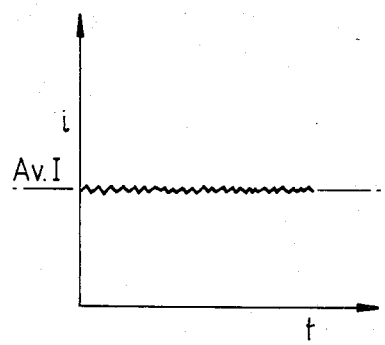
FIGS. 2A-2C illustrate the variation of current in the circuit of FIG. 1 under different conditions.

If the notional switch was operated at a high frequency, the instantaneous current i in the circuit would scarcely deviate from its average value, as illustrated in FIG. 2A. Under these conditions, the average current I would be given by $$\frac{E - V_w}{R}$$

where E is the e.m.f. of the power source 1. Thus, $$I = \frac{E - \frac{(M)}{M+1} V_A}{R}$$

Figure 2B:
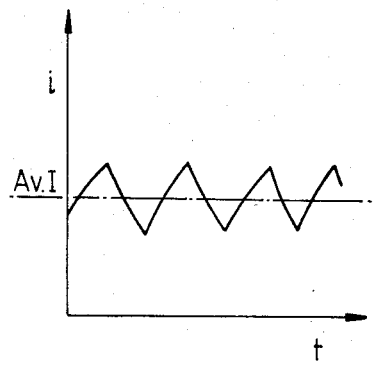
Figure 2C:
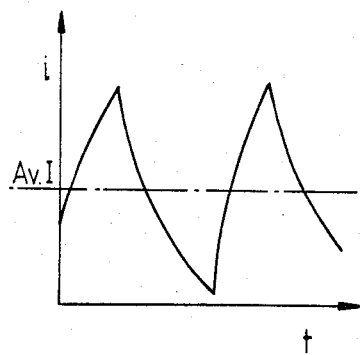

In practice, the instantaneous current rises and falls by a significant amount compared with the average current, as illustrated in FIG. 2B. In some cases, under more severe short-circuiting conditions, the fluctuation in current can be so large that it virtually reaches zero at its minimum (FIG. 2C).

Figure 3A:
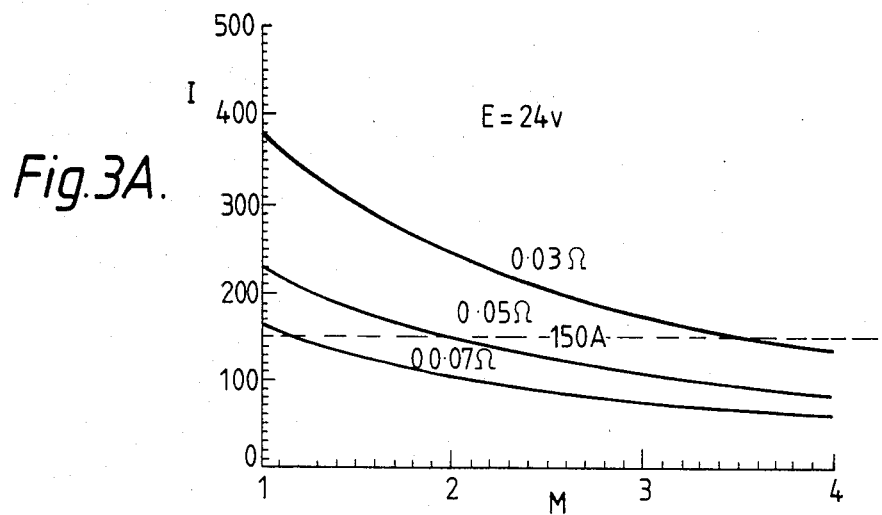
FIGS. 3A-3C illustrate the variation of average current with the ratio of mean arc duration to mean short-circuit duration.
Figure 3B:
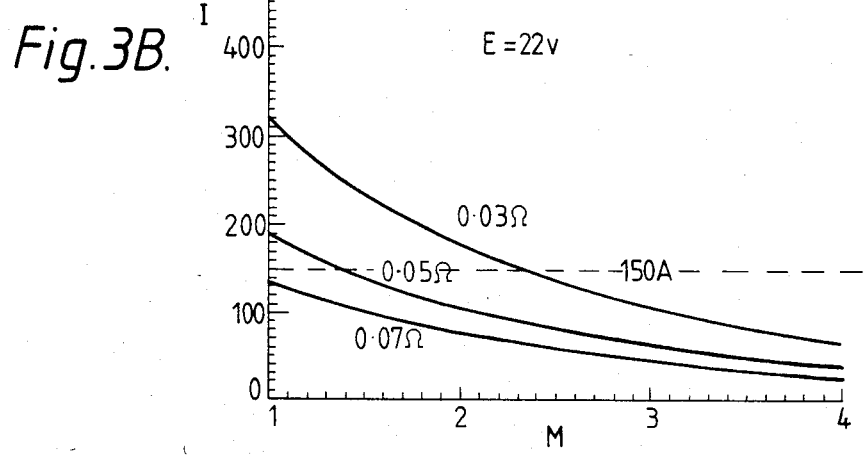
Figure 3C:
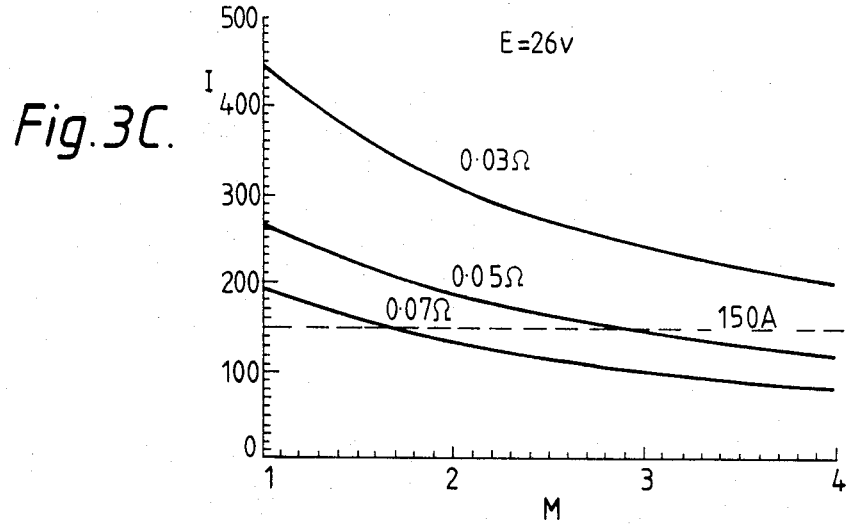

We have found that if the welding circuit is analysed in its practical form with instantaneous current rise and fall, but allowing for an arc with a rising voltage/current characteristic, substantially the same average current results. In other words, for a given welding arc load, i.e. ratio M, the average current is determined principally by the open-circuit voltage E and the circuit resistance R and is virtually independent of circuit inductance (L), short-circuit frequency, and amplitude current swing. The relationship between I, E, M, and circuit resistance R, can be seen in FIGS. 3A-3C for the particular case of a constant potential arc. Thus, it can be seen from these figures that the curves relating average current to M become severely compressed or expanded with only a moderate change (less than ±10 percent) in open-circuit voltage. In these examples, a constant arc voltage $V_A$ of 25 volts is present. Similiar results accrue for an arc with a rising voltage/current characteristic.

Since in practice the required average current I, such as 150 A is essentially determined by the wire feed speed, the power source 1 is enabled within limits to provide this current by suitable modification of M only, without reference to the actual short-circuit frequency.

Rearrangement of the basic equation above gives the following:

$$M = \frac{V_A}{V_A - (E - IR)} - 1$$

Figure 4:
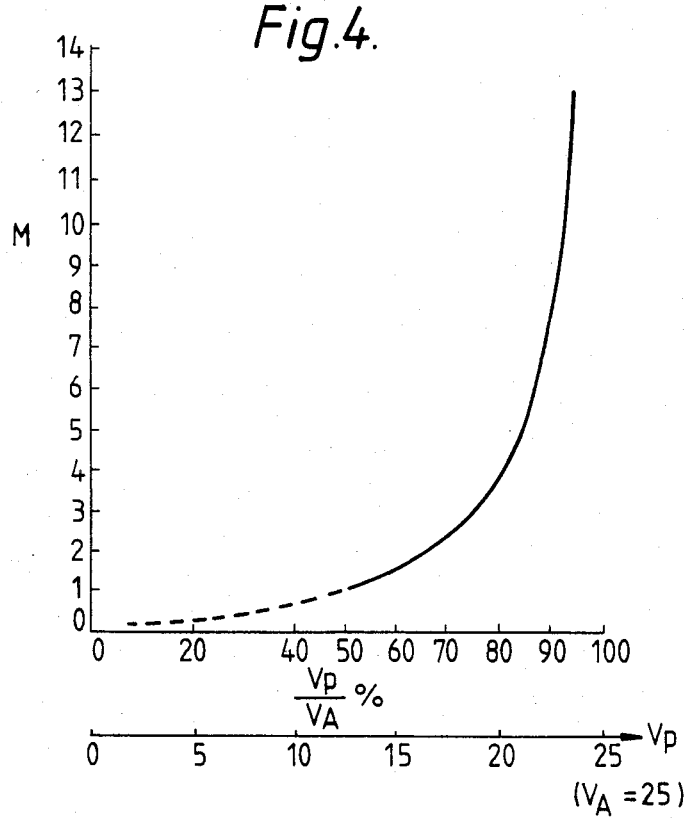
FIG. 4 illustrates the variation of the ratio of mean arc duration to mean short-circuit duration with open-circuit voltage less all resistive losses.

FIG. 4 illustrates how M varies with the remainder power source output $V_p$ (i.e. E−IR) as a percentage of the constant arc voltage $V_A$. It is apparent that a small change in either the true arc voltage or the remainder power source output has a considerable effect on the value of M.

Thus, this ratio M serves as a sensitive index of the operation of the short-circuit MIG arc system and responds to changes in open-circuit voltage, arc voltage, and circuit resistive losses. In this way, the ratio M can be used to control the short-circuiting MIG arc in the feed back loop by adjusting the open-circuit voltage to compensate for variations in the arc voltage and resistive losses, as well as any changes associated with a mains operated power supply 1. This parameter M is extremely useful since it is not difficult to measure and at the same time it is governed by the inter-relationships in the power supply/arc network. Also, at the values of M likely to be used (for example above about 3) this control parameter is more sensitive to external changes than that of percentage arc time or average welding voltage.

In order to monitor M a control unit 9 is provided which senses the voltage drop between the electrode wire 2 and the work piece 4 in use via connecting leads 10, 10'. Some examples of the control unit 9 are shown in more detail in FIGS. 5, 6, and 8.

Figure 5:
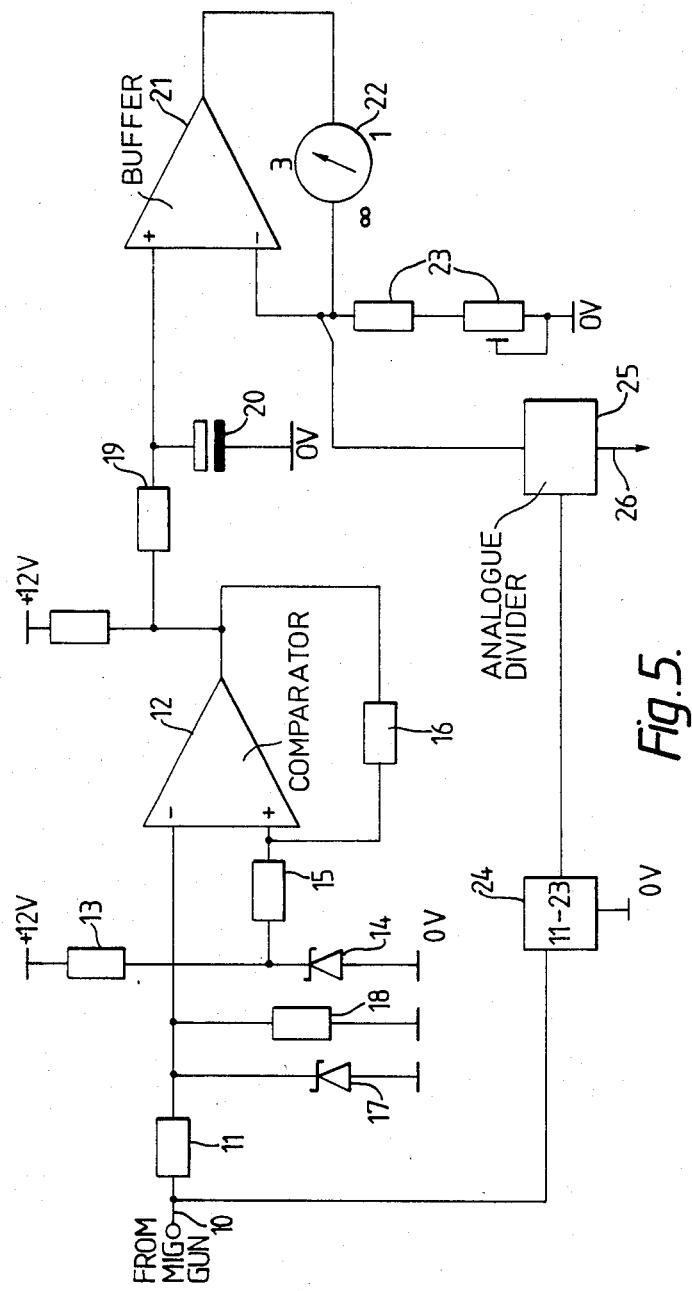
FIG. 5 is a circuit diagram illustrating a circuit for determining an average value of M.

FIG. 5 is a diagram of a circuit for determining and displaying the ratio M. The potential on the connecting lead 10 is applied via a resistor 11 to the inverting input of a comparator 12. A suitable comparator 12 is known by the reference LM311. A reference voltage (in this case 9 volts) is fed to the non-inverting input of the comparator 12 and is set up by means of a resistance 13 in series with a diode 14 to which a 12 volt supply is fed. A portion of the 12 volt supply is tapped off via a resistance 15 connected to the non-inverting input of the comparator 12. In addition, a hysteresis resistance 16 is connected between the output of the comparator 12 and the non-inverting input. The arc voltage on the connecting lead 10 is clipped prior to being fed to the comparator 12 so as to avoid excess voltages and open-circuit voltages being imposed on the detector circuit. The clipping voltage is conveniently a few volts greater than the reference voltage, for example 12 volts as compared with 9 volts. Clipping is achieved by connecting the lead 10 with ground via a diode 17 and a parallel resistance 18 in conjunction with the series resistor 11.

The output signal from the comparator 12 will now be in one of two states, either zero volts indicating the arc-on condition or 12 volts indicating the short-circuit condition. By setting the comparator reference voltage at 9 volts the circuit can easily distinguish between the two conditions since in fact during arc-on the potential on the lead 10 will range upwards from 20 volts while during short-circuiting the potential will be between two and three volts. Preferably, the reference voltage is set between 8 and 10 volts, the higher voltage being particularly preferable where the connecting lead 10 is taken near the power supply rather than near the arc and allows for the extra voltage drop along the welding power leads 3, 5.

The output signal from the comparator 12 is fed via a resistance 19 to a capacitor 20. Thus, the average potential on the capacitor 20 represents the percentage short-circuiting time. The time constant of the capacitor/resistance 20, 19 combination is chosen as appropriate to define approximately the number of short circuit cycles being taken into account at any one time. In one example the resistance 19 may be 47 KΩ and the capacitor 20 2.2 μF.

The potential on the capacitor 20 is applied to the non-inverting input of a buffer amplifier 21. A suitable buffer amplifier 21 is known by the reference LM308. The output from the buffer amplifier 21 is then fed to a non-linear indicating meter 22. The buffer amplifier 21 gives nominally full scale deflection for 50 percent arcing (M=1) and half deflection where the arcing period on average is three times the short-circuiting period (M=3). Zero meter deflection corresponds to continuous arcing (M=∞). The minimum meter scaling (maximum meter deflection) is adjustable by means of resistances 23 acting as a feedback applied to the inverting input of the buffer amplifier 21. Typically, M is around 4. The control unit 9 may further include a second circuit 24 similar to the circuit just described. The comparator equivalent to the comparator 12 generates a 12 volt signal during each arc-on period, this being stored on a capacitor equivalent to the capacitor 20. The output signals from the buffer amplifier 21 and the equivalent buffer amplifier of the circuit 24 are both fed to a conventional analogue divider 25 which provides an output on a line 26 which is connected to the power supply 1 to adjust the mean value of the supply voltage. Alternatively, the output from the analogue divider 25 may be applied to the drive means 8' to control the feed rollers 8. In addition, the value of M derived by the analogue divider 25 may be displayed by a suitably calibrated meter and conveniently the divider 25 may be arranged so that its maximum output (nominally 10 volts) corresponds to a ratio M of 10.

Figure 6:
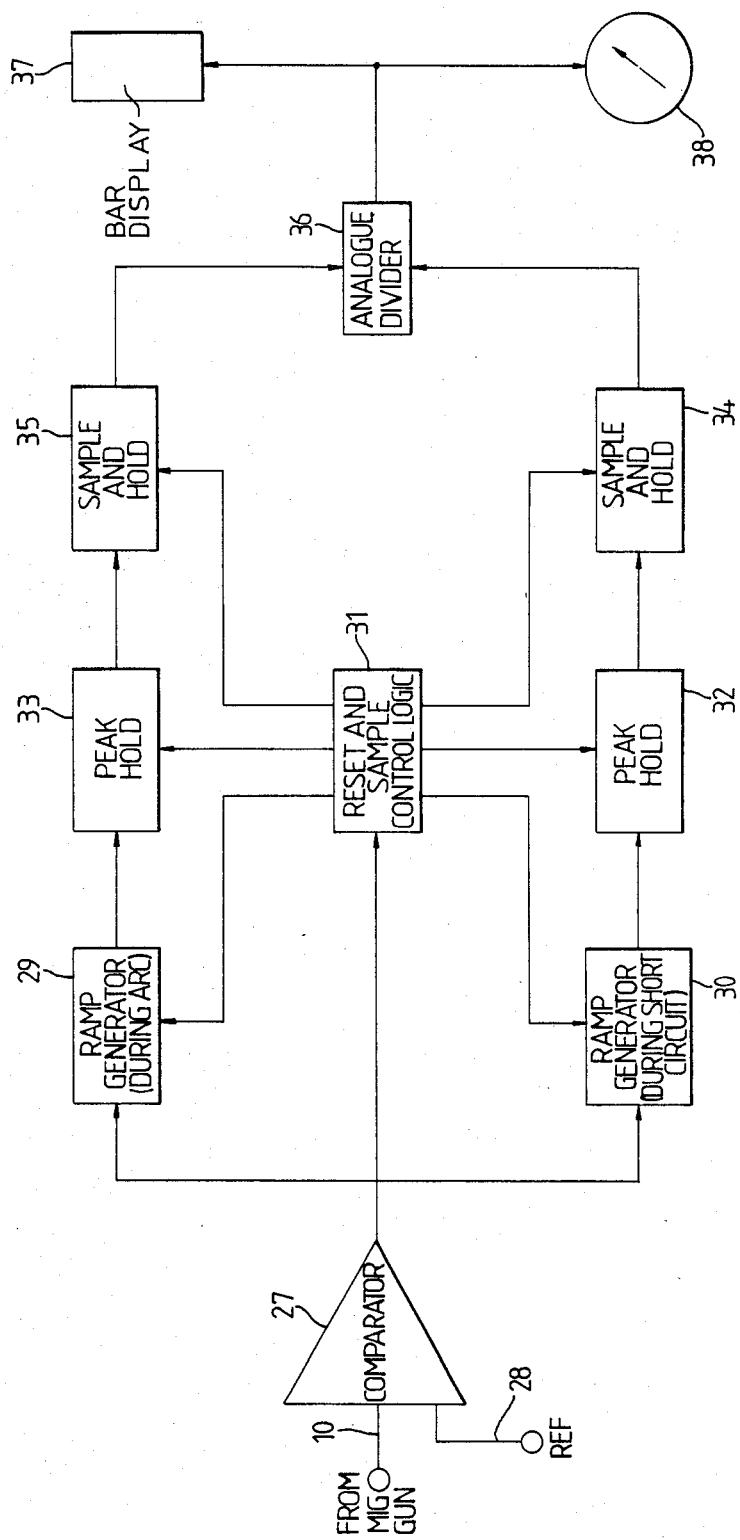
FIG. 6 is a block circuit diagram illustrating apparatus for determining instantaneous values of M
Figure 7A:
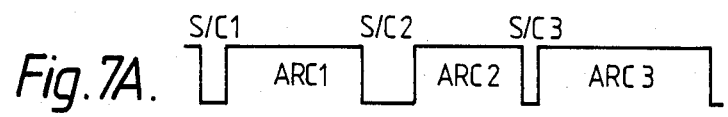
FIGS. 7A-7H are waveform diagrams for different positions in the circuit shown in FIG. 6.
Figure 7B:
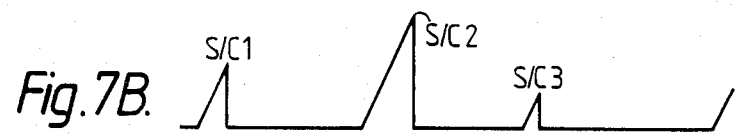
Figure 7C:
Figure 7D:
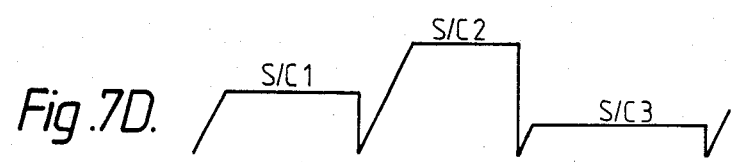
Figure 7E:
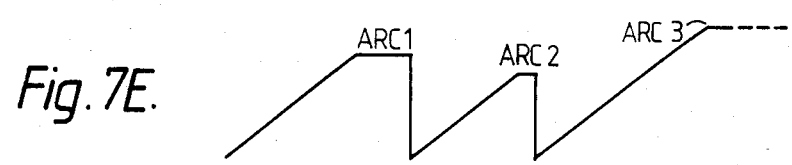
Figure 7F:
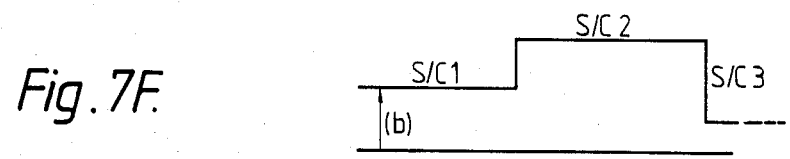
Figure 7G:
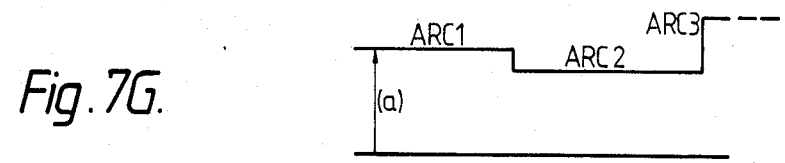
Figure 7H:
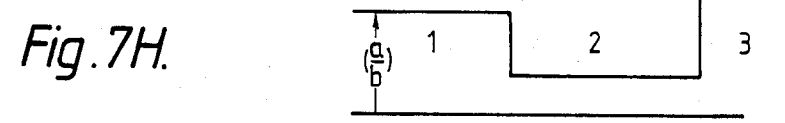

The control unit 9 just described is suitable for deriving average values of the ratio M. For instantaneous values of the ratio or for relatively short term average values, the arc durations should be related to their corresponding prior short-circuit durations and a block circuit diagram of suitable circuitry for the control unit 9 is illustrated in FIG. 6. As in FIG. 5, the arc voltage is applied along the connecting lead 10 to a comparator 27 where it is compared with a reference voltage on a line 28. The output signal from the comparator 27 is illustrated in FIG. 7A. The output signal has a voltage which varies between 0 volts indicating the short-circuit condition and 5 volts indicating the arc-on condition. The output signal from the comparator 27 is fed to a pair of conventional ramp generators 29, 30 and to control logic 31. The ramp generator 30 is initiated in response to receiving a high-to-low transition and is reset by the control logic 31 at the end of the short circuit period. The output signal from the ramp generator 30 is fed to peak hold circuit 32 and is illustrated in FIG. 7B. The ramp signal generator 29 is responsive to a low-to-high transition in the output signal from the comparator 27 to initiate a ramp signal which is terminated by the control logic 31 at the end of the arc-on period. The output signal from the ramp generator 29 is fed to a peak hold circuit 33 and is illustrated in FIG. 7C. The peak hold circuits 32, 33 supply output signals to respective sample and hold circuits 34, 35 in the form shown in FIGS. 7D and 7E. Each sample and hold circuit 34, 35 provides an output signal whose magnitude represents the duration of the latest short-circuit or arc-on period respectively. The outputs are indicated in FIGS. 7F, 7G respectively. The output signals are fed to an analogue divider 36 which divides the arc-on signal from the circuit 35 by the short-circuit signal from the circuit 34 for each individual arc-on short-circuit cycle. The output signal from the analogue divider 36 is indicated in FIG. 7H and is fed to a conventional bar display 37 and to a meter 38 allowing the welding operation to be monitored. Typically, the meter 38 will have a relatively slow response in comparison to the bar or LED display 37 and thus indicate longer term averages. Where required, the response of the indicators 37, 38 can be damped by conventional resistance/capacitance time constants.

As shown in FIGS. 7B, 7C the ramp rates for the short-circuit duration are greater than those for the arc duration (by ratio approximately 2.7). This enables the analogue divider 36 to operate at a mid-range condition with sufficient tolerance for low and high values of the instanteous ratio M. Thus, as shown, the true instantaneous M values are 2.7 × the nominal divider 36 output.

Figure 8:
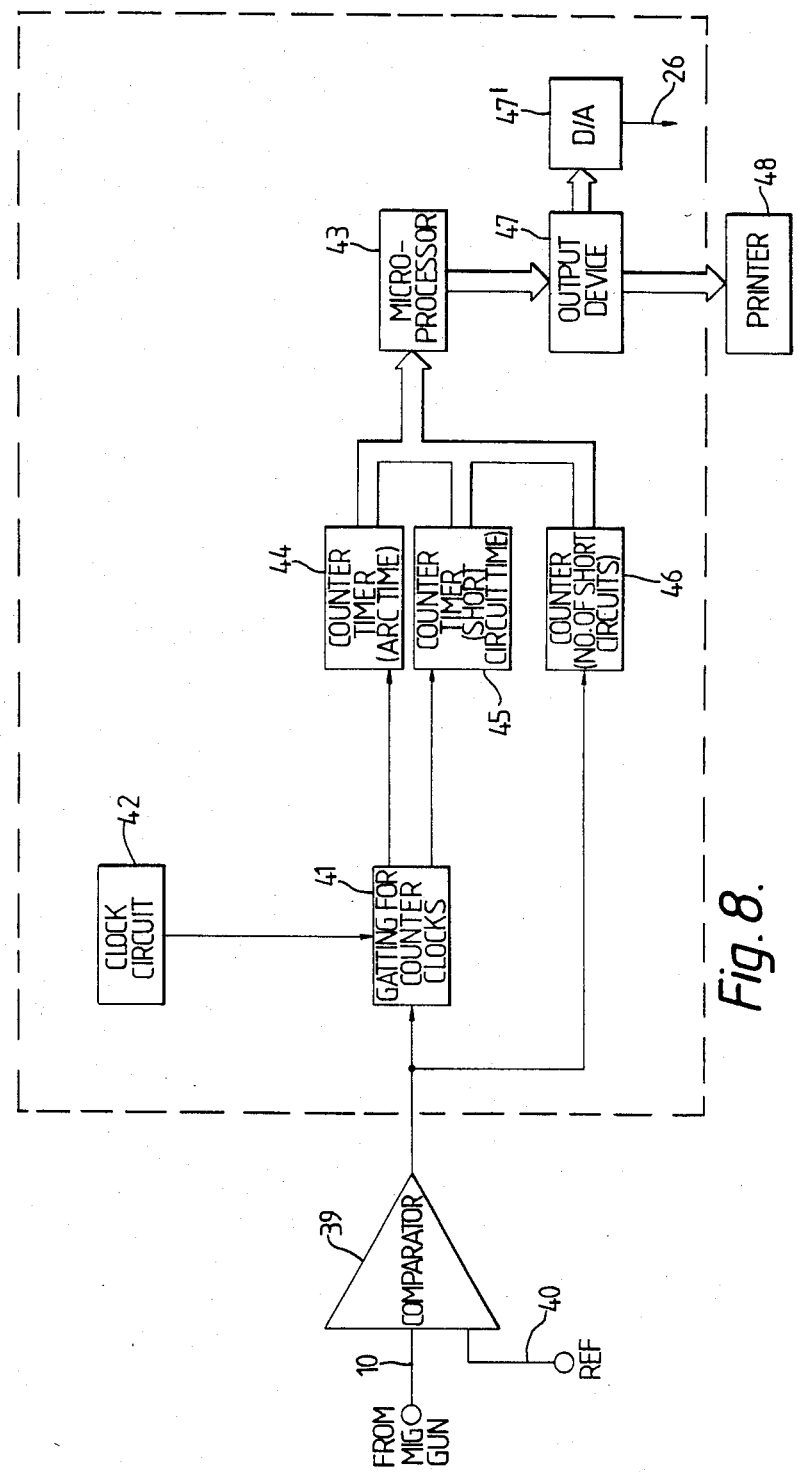
FIG. 8 is a block diagram of a micro-processor system for determining average values of M.
Figure 9:
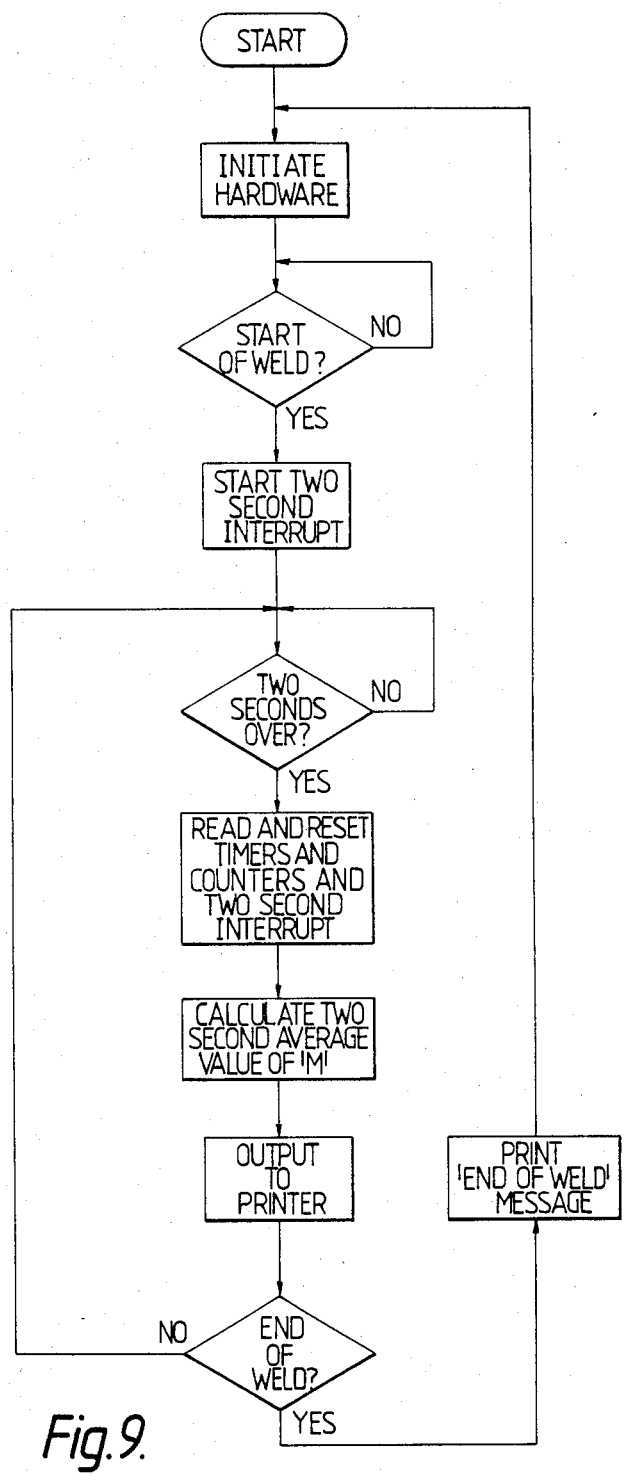
FIG. 9 is a flow chart illustrating the operation of the micro-processor system shown in FIG. 8; and, FIG. 10 is a circuit diagram illustrating a circuit for modulating the welding circuit potential.

FIG. 8 illustrates a digital form for the control unit 9. Once again, the potential on the line 10 is applied to a comparator 39 where it is compared with a reference voltage on a line 40. The output from the comparator 39 which is a signal which is 0 volts during a short-circuit period and 5 volts during an arc-on period, is fed to a gate circuit 41. A clock circuit 42 is actuated by the gate circuit 41 to provide data for a micro-processor 43. Under control from the comparator 39, the gate circuit 41 allows the clock signal to be fed to a pair of digital counters 44, 45 which are read and reset say every two seconds. At the same time, the output signal from the comparator 39 is fed to a digital counter 46. The operation of the system shown in FIG. 8 is illustrated in flow diagram form in FIG. 9. Operation is under the control of the micro-processor 43 which is suitably programmed. At start-up, the hardware is initialised by the micro-processor 43 and when the start of a weld is detected, the micro-processor 43 resets the counters 44, 45, 46. While the comparator 39 is say high the output signal from the clock 42 is fed to the counter 44 which sums the total arc-on time. Conversely the clock signal is fed to the counter 45 which sums the total short-circuit time when the comparator output is low. The counter 46 counts the total number of short-circuits. At the end of the set period, say two seconds, as determined by the microprocessor 43 the counter timers 44, 45 and the counter 46 are registered and reset. The microprocessor 43 then calculates from the previously determined times generated by the counters 44, 45 the average value of M over the two second period. This is determined by dividing the time recorded by the counter 44 by the time recorded by the counter 45. In addition, other information may be calculated such as the average short-circuit period. The calculated information is then output by a suitable output device 47 to a printer 48. The printer 48 provides an output similar to that shown in the table below.

TABLE

| AVERAGE M | TOTAL WELDING TIME 16 seconds | | |
|---|---|---|---|
| | TOTAL NO S/C | TOTAL S/C(ms) | AVERAGE S/C(ms) |
| 8.4 | 18 | 212 | 11.8 |
| 7.1 | 59 | 247 | 4.2 |
| 6.2 | 77 | 277 | 3.6 |
| 3.9 | 111 | 408 | 3.7 |
| 2.2 | 175 | 588 | 3.4 |
| 2.7 | 146 | 540 | 3.7 |
| 2.8 | 137 | 526 | 3.8 |
| 3.0 | 129 | 502 | 3.9 |

This table represents successive two second intervals and provides details of the total welding time at the end. After printing this "end of weld" message the microprocessor returns to the initiate hard-ware step.

In addition, the output device 47 may feed appropriate signals to a digital to analogue converter 47' whose output may be fed to the power supply 1 via the connecting lead 26 as previously described in order to adjust the e.m.f. generated by the power supply.

It will be appreciated that in the digital form of the control unit 9 shown in FIG. 8, it is particularly simple to determine short term values of M simply by adjusting the length of the interrupt period.

Typically, the gate 41, clock circuit 42, counters 44, 45, 46, microprocessor 43, output device 47 and converter 47' are all located on the same computer board.

It has previously been mentioned that it is desirable to control the short-circuit frequency. One way in which this may be achieved is shown in FIG. 1.

FIG. 1 illustrates a diode 49 connected in the connection lead 5 together with a switch unit 50. The diode 49 may represent one of a set of diodes arranged in series or alternatively could be replaced by a simple resistance. The switching unit 50 may be a conventional transistor or thyristor semi-conductor. Control of short-circuit frequency is achieved by causing the switching unit 50 effectively to connect the negative terminal of the power supply 1 to the workpiece 4 alternately through the diode 49 or more directly via the switch 50. This may be at a preset frequency or alternatively at a frequency determined as a function of the control unit 9.

Figure 10:
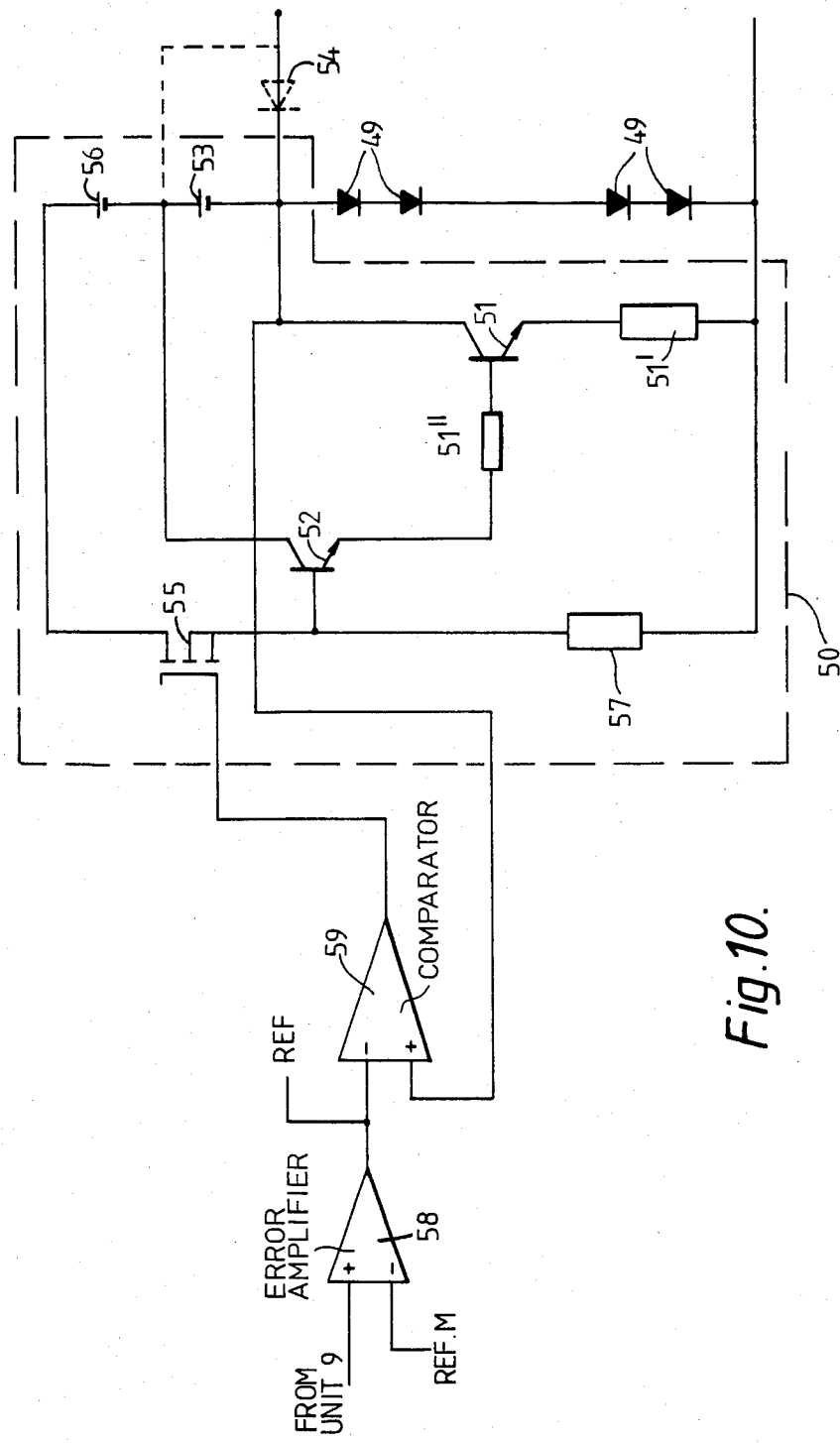

In one arrangement shown in FIG. 10, a group of high current transistors 51 (only one shown in FIG. 10) are in parallel with the set of series diodes 49, the combination being in series with the main welding circuit. The high current shunting transistor 51 may comprise say 10 transistors type 2N6032 operated in parallel together, for currents up to 500 A. To assist current balance the emitters may each be provided with a low resistance 51' of 0.01Ω and base resistors 51" are each adjusted so that the maximum currents (about 50 A) in the transistors are approximately equal. The base resistor 51" may conveniently be in the range 0.1 to 0.5 Ω and the balance determined with a suitable low voltage say 2.0 V being applied to the base resistor.

The drive 52 for the set of parallel transistors 51 comprises another high current transistor type 2N6032 with its collector connected to a slightly higher potential than that of transistors 51. The increased potential may comprise a low voltage power supply 53 such as an accumulator, or more conveniently can be derived from a further diode 54 in the welding power supply. The drive transistor 52 in turn can be controlled by a semiconductor device 55 acting as a variable resistance such as a Mosfet device which is connected to a further low potential supply 56. The device 55 in its active state provides a low resistance path to the base of the drive transistor 52 or conversely serves to open circuit the base supply. To ensure that transistors 52 and 51 are effectively turned off, the base of the drive transistor 52 can be conveniently grounded through a resistor 57 which is intermediate in value between the on and off states of the device 55.

The above arrangement allows a major change in voltage drop from that provided by the diodes 49 to virtually the collector/emitter saturation voltage of the high current transistors 51. Alternatively using a feedback and a comparator 59 to compare the total diode voltage with a reference such that the amplified error is applied to control the device 55, any intermediate voltage drop can be maintained across the diode/transistor combination 49/51. This may also be used to control the average ratio M of the short-circuiting arc for a given power supply setting. Thus for example the output from the control unit 9 can be compared with a reference using an error amplifier 58 which in turn provides the signal reference for the aforementioned error control for the device 55.

I claim:

1. In a method of short-circuit MIG welding in which electrode wire and a workpiece in a welding circuit are moved relatively to one another and in which periods of arcing and short-circuiting successively occur between the electrode wire and the workpiece the improvement comprising monitoring the ratio of the mean of the arc duration to the mean of the short-circuit duration.

2. A method according to claim 1, wherein said ratio is determined over between four and twelve successive short-circuit cycles.

3. A method according to claim 1, further comprising maintaining said monitored ratio substantially constant by adjusting one or more of the open circuit voltage, the effective resistance of the welding circuit, and the average wire feed speed.

4. A method according to claim 3, wherein one or both of said open circuit voltage and said wire feed speed are additionally oscillated about respective mean values to control the frequency of short-circuiting.

5. A method according to claim 3, wherein said open circuit voltage and said wire feed speed are modulated to obtain a preselected mark space ratio.

6. A method according to claim 3, wherein said open circuit voltage or said wire feed speed is modulated to obtain a preselected mark space ratio.

7. In a method of short-circuit MIG welding in which electrode wire and a workpiece in a welding circuit are moved relatively to one another, and in which periods of arcing and short-circuiting successively occur between the electrode wire and the workpiece, the improvement comprising monitoring the ratio of the successive integral of the arc duration to the successive integral of the short-circuit duration.

8. A method according to claim 7, wherein said ratio is determined over between four and twelve successive short-circuit cycles.

9. A method according to claim 7, further comprising maintaining said monitored ratio substantially constant by adjusting one or more of the open circuit voltage, the effective resistance of the welding circuit, and the average wire feed speed.

10. A method according to claim 9, wherein one or both of said open circuit voltage and said wire feed speed are additionally oscillated about respective mean values to control the frequency of short-circuiting.

11. A method according to claim 9, wherein said open circuit voltage and said wire feed speed are modulated to obtain a preselected mark space ratio.

12. A method according to claim 9, wherein said open circuit voltage or said wire feed speed is modulated to obtain a preselected mark space ratio.

13. Short-circuit MIG welding apparatus comprising a power supply adapted to be electrically connected in a welding circuit with electrode wire and a workpiece; and electrode wire feed means, wherein the apparatus further includes means for monitorng the ratio of the mean of the arc duration to the mean of the short-circuit duration.

14. Short-circuit MIG welding apparatus according to claim 13, wherein said monitoring means includes a capacitor which is adapted to be charged as a function of said mean short-circuit duration; and indicating means for providing an indication of the charge stored by said capacitor.

15. Short-circuit MIG welding apparatus according to claim 14, further comprising control means adapted to adjust one or more of the effective emf of said power supply, the effective resistance of said welding circuit and the average wire feed speed in accordance with a signal supplied by said monitoring means representative of said stored charge.

16. Short-circuit MIG welding apparatus according to claim 13, wherein said monitoring means includes means for determining the mean of the arc duration and the mean of the short-circuit duration and means for determining the ratio therebetween, and means for providing an indication of said determined ratio.

17. Short-circuit MIG welding apparatus according to claim 16, further comprising control means adapted to adjust one or more of the effective emf of said power supply, the effective resistance of said welding circuit and the average wire feed speed in accordance with a signal supplied by said monitoring means representative of said determined ratio.

18. Short-circuit MIG welding apparatus according to claim 13, further comprising a switched impedance in said welding circuit adapted to modulate the effective emf of said power supply.

19. Short-circuit MIG welding apparatus comprising a power supply adapted to be electrically connected in a welding circuit with electrode wire and a workpiece; and electrode wire feed means, wherein the apparatus further includes means for monitoring the ratio of the successive integral of the arc duration to the successive integral of the short-circuit duration.

20. Short-circuit MIG welding apparatus according to claim 15, wherein said monitoring means includes means for determining the successive integral of the arc duration and the successive integral of the short-circuit duration and means for determining the ratio therebetween, and means for providing an indication of said determined ratio.

21. Short-circuit MIG welding apparatus according to claim 20, further comprising control means adapted to adjust one or more of the effective emf of said power supply, the effective resistance of the said welding circuit, and the average wire feed speed in accordance with a signal supplied by said monitoring means representative of said determined ratio.

22. Short-circuit MIG welding apparatus according to claim 19, further comprising a switched impedance in said welding circuit adapted to modulate the effective emf of said power supply.

* * * * *